United States Patent
Hörold

(10) Patent No.: US 6,420,459 B1
(45) Date of Patent: Jul. 16, 2002

(54) FLAME-RETARDING THERMOSETTING COMPOSITIONS

(75) Inventor: Sebastian Hörold, Erftstadt (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/491,321

(22) Filed: Jan. 25, 2000

(30) Foreign Application Priority Data

Jan. 30, 1999 (DE) .......................... 199 03 707

(51) Int. Cl.$^7$ .................. C08K 95/00; C08K 67/00
(52) U.S. Cl. .............. 523/451; 523/506; 524/133; 524/134; 524/136; 524/417; 524/436
(58) Field of Search .................. 524/133, 134, 524/135, 126, 436, 437, 416; 523/451, 506

(56) References Cited

U.S. PATENT DOCUMENTS

| | | | |
|---|---|---|---|
| 3,397,035 A | | 8/1968 | Shen et al. .................. 23/106 |
| 3,594,347 A | | 7/1971 | Lazarus et al. .......... 260/45.75 |
| 3,900,444 A | * | 8/1975 | Racky et al. ............... 524/133 |
| 4,036,811 A | | 7/1977 | Noetzel et al. |
| 4,049,612 A | * | 9/1977 | Sandler ....................... 524/126 |
| 4,078,016 A | | 3/1978 | Kramer ....................... 260/860 |
| 4,100,089 A | * | 7/1978 | Cammack et al. .......... 524/126 |
| 4,180,495 A | * | 12/1979 | Sandler ....................... 524/136 |
| 4,208,321 A | * | 6/1980 | Sandler ....................... 524/126 |
| 4,208,322 A | | 6/1980 | Sandler ............... 260/45.75 K |
| 4,618,633 A | * | 10/1986 | Taubitz et al. .............. 524/133 |
| 4,632,946 A | | 12/1986 | Muench et al. ............. 523/179 |
| 4,853,424 A | | 8/1989 | Staendeke et al. .......... 523/506 |
| 5,102,931 A | | 4/1992 | Fuhr et al. .................. 524/126 |
| 5,115,005 A | * | 5/1992 | Homer ........................ 524/133 |
| 5,164,437 A | | 11/1992 | Chakrabarti et al. ........ 524/300 |
| 5,173,515 A | | 12/1992 | von Bonin et al. ......... 521/103 |
| 5,281,637 A | | 1/1994 | Blöcker ....................... 524/100 |
| 5,326,805 A | | 7/1994 | Sicken et al. ............... 524/101 |
| 5,773,556 A | * | 6/1998 | Kleiner et al. .............. 524/133 |
| 5,780,534 A | | 7/1998 | Kleiner et al. |
| 5,852,085 A | * | 12/1998 | Brown et al. ............... 524/133 |
| 5,891,226 A | * | 4/1999 | Kleiner et al. .............. 524/147 |
| 5,973,194 A | * | 10/1999 | Weferling et al. ........... 524/133 |
| 6,207,736 B1 | * | 3/2001 | Nass et al. .................. 524/133 |
| 6,255,371 B1 | * | 7/2001 | Schlosser et al. ........... 524/133 |

FOREIGN PATENT DOCUMENTS

| | | |
|---|---|---|
| AU | 711202 | 11/1997 |
| DE | A-21 59 757 | 6/1973 |
| DE | A-24 47 727 | 4/1976 |
| DE | 3728629 A1 | 3/1989 |
| DE | A-44 30 932 | 3/1996 |
| DE | 197 08 726 | 9/1998 |
| EP | 0006568 | 1/1980 |
| EP | 0327496 | 8/1989 |
| EP | 0699708 | 3/1996 |
| EP | 0 806 429 | 11/1997 |
| GB | 14 14 998 | 11/1975 |
| GB | 2021598 | 12/1979 |
| JP | 5-245838 | 3/1992 |
| JP | 55-94918 | 9/1993 |
| JP | 57-16017 | 9/1993 |
| PL | 159350 | 12/1992 |
| PL | 161333 | 6/1993 |
| WO | WO 97/01664 | 1/1997 |
| WO | WO 97/39053 | 10/1997 |
| WO | WO 98/03515 | 1/1998 |
| WO | WO 98/39381 | 9/1998 |

OTHER PUBLICATIONS

Derwent Patent Family Abstract for DE 197 08 726.
Derwent Patent Family Abstract for EP 0 806 429.
Staufer, G., Sperl, M., Begemann, M., Buhl, D., Düll–Mühlenbach, I., Kunststoffe 85 (1995) 4.
XP002085231 & JP 05 051511 A(Ashahi Chem Ind Co Ltd) Mar. 2, 1993.
Patent Abstract of Japan—Publication No. 05339417.
Patent Abstract of Japan—Publication No. 05086254.
STN Easy Patent Abstract for WO 98/39381.
Ullmann's Encyclopedia of Industrial Chemistry, ed. Barbara Elvers, vol. 21 A, Chapter 'Polyesters' VCH, Weinheim–Basle–Cambridge–New York, 1992, pp. 227–251.

* cited by examiner

*Primary Examiner*—Veronica P. Hoke
(74) *Attorney, Agent, or Firm*—Susan S. Jackson; Scott E. Hanf

(57) ABSTRACT

The invention relates to flame-retardant thermoset compositions which comprise, as flame retardant, at least one phosphinic and/or a diphosphinic salt of these.

22 Claims, No Drawings

FLAME-RETARDING THERMOSETTING COMPOSITIONS

The invention relates to flame-retardant thermoset compositions, to a process for their preparation, and to their use.

BACKGROUND OF THE INVENTION

Components made from thermoset resins, in particular those which have glass-fiber reinforcement, feature good mechanical properties, low density, substantial chemical resistance and excellent surface quality. This and their low cost has led to their increasing use as replacements for metallic materials in the application sectors of rail vehicles, the construction of buildings and air travel.

Unsaturated polyester resins (UP resins), epoxy resins (EP resins) and polyurethanes (PU resins) are combustible and therefore need flame retardants in some applications. Increasing demands in the market for fire protection and for environmental compatibility in products are increasing interest in halogen-free flame retardants, for example in phosphorus compounds or metal hydroxides.

Depending on the application sector, there are different requirements in relation to mechanical, electrical and fire-protection properties. In the rail vehicle sector in particular, fire-protection requirements have recently been made more stringent.

It is known that bromine- or chlorine-containing acid and/or alcohol components are used to formulate flame-retardant unsaturated polyester resins. Examples of these components are hexachloroendomethylene tetrahydrophthalic acid (HET acid), tetrabromophthalic acid and dibromoneopentyl glycol. Antimony trioxide is often used as a synergist.

In JP 05245838 (CA 1993: 672700), aluminum hydroxide, red phosphorus and antimony trioxide are combined with a brominated resin to improve flame retardancy. A disadvantage of bromine- and chlorine-containing resins is that corrosive gases are produced in a fire, and this can result in considerable damage to electronic components, for example to relays in rail vehicles. Unfavorable conditions can also lead to the formation of polychlorinated or brominated dibenzodioxins and furans. There is therefore a requirement for unsaturated polyester resins and unsaturated polyester molding compositions which are flame-retardant and halogen-free.

It is known that unsaturated polyester resins and unsaturated polyester molding compositions may be provided with fillers, such as aluminum hydroxide. The elimination of water from aluminum hydroxide at elevated temperatures gives some degree of flame retardancy. At filler levels of from 150 to 200 parts of aluminum hydroxide per 100 parts of UP resin it is possible to achieve self-extinguishing properties and low smoke density. A disadvantage of systems of this type is their high specific gravity, and attempts are made to reduce this by adding, for example, hollow glass beads [Staufer, G., Sperl, M., Begemann, M., Buhl, D., Düll-Muhlbach, I., Kunststoffe 85 (1995), 4].

PL 159350 (CA 1995: 240054) describes laminates made from unsaturated polyester resins with up to 180 parts of magnesium hydroxide. However, injection processes, which are extremely important industrially, cannot be used with formulations of this type, due to the high viscosity of the uncured UP resin with the aluminum hydroxide or, respectively, magnesium hydroxide.

The processes described at a later stage below for formulating flame-retardant unsaturated polyester resins likewise have a large number of disadvantages, in particular the requirement for a very high filler content.

To reduce the total filler content, aluminum hydroxide can be combined with ammonium polyphosphate, as described in DE-A-37 28 629. JP 57016017 (CA96(22): 182248) describes the use of red phosphorus as a flame retardant for unsaturated polyester resins, and JP 55094918 (CA93(24): 22152t) describes the combination of aluminum hydroxide, red phosphorus and antimony trioxide.

PL 161333 (CA 1994: 632278) achieves low smoke density and low-toxicity decomposition products by using aluminum hydroxide, magnesium hydroxide or basic magnesium carbonate, red phosphorus and, if desired, finely dispersed silica. DE-A-2159757 moreover claims the use of melamine and aluminum hydroxide.

Since aluminum hydroxide on its own is not a very effective flame retardant for unsaturated polyester resins or for epoxy resins, combinations with red phosphorus are also proposed, in order to reduce the filler content. A disadvantage here, however, is the red intrinsic color of the product, limiting its use to components with dark pigmentation.

Unsaturated polyester resins are solutions, in copolymerizable monomers, preferably styrene or methyl methacrylate, of polycondensation products made from saturated and unsaturated dicarboxylic acids, or from anhydrides of these, together with diols. UP resins are cured by free-radical polymerization using initiators (e.g. peroxides) and accelerators. The double bonds in the polyester chain react with the double bond in the copolymerizable solvent monomer. The most important dicarboxylic acids for preparing the polyesters are maleic anhydride, fumaric acid and terephthalic acid. The diol most frequently used is 1,2-propanediol. Use is also made of ethylene glycol, diethylene glycol and neopentyl glycol, inter alia. The most suitable crosslinking monomer is styrene. Styrene is fully miscible with the resins and copolymerizes readily. The styrene content in unsaturated polyester resins is normally from 25 to 40%. A monomer which can be used instead of styrene is methyl methacrylate.

Another group of thermosets, epoxy resins, are nowadays used for preparing molding compositions and coatings with a high level of thermal, mechanical and electronic properties.

Epoxy resins are compounds prepared by a polyaddition reaction of an epoxy resin component with a crosslinking (hardener) component. The epoxy resin components used are aromatic polyglycidyl esters, such as bisphenol A diglycidyl ester, bisphenol F diglycidyl ester or polyglycidyl esters of phenol-formaldehyde resins or cresol-formaldehyde resins, or polyglycidyl esters of phthalic, isophthalic or terephthalic acid, or else of trimellitic acid, N-glycidyl compounds of aromatic amines or of heterocyclic nitrogen bases, or else di- or polyglycidyl compounds of polyhydric aliphatic alcohols. Hardeners which are used are polyamines, such as triethylene tetramine, aminoethylpiperazine or isophoronediamine, polyamidoamines, polybasic acids or anhydrides of these, e.g. phthalic anhydride, hexahydrophthalic anhydride or methyltetrahydrophthalic anhydride, or phenols. The crosslinking may also take place via polymerization using suitable catalysts.

Epoxy resins are suitable for the potting of electrical or electronic components, and for saturation and impregnation processes. The epoxy resins used in electrical engineering are predominantly flame-retardant and used for printed circuit boards or insulators.

In the prior art, epoxy resins for printed circuit boards are currently rendered flame-retardant by including brominecontaining aromatic compounds in the reaction, in particular tetrabromobisphenol A. A disadvantage is that brominated hydrocarbon (a dangerous substance) is liberated in a fire, and this can cause corrosion damage. Under unfavorable conditions, polybrominated dibenzodioxins and furans can also be produced. The use of aluminum hydroxide is completely excluded since it eliminates water when processed.

Fire-protection requirements for electrical and electronic equipment are laid down in specifications and standards for product safety. In the US, fire-protection testing and approval procedures are carried out by Underwriters Laboratories (UL), and UL specifications are nowadays accepted worldwide. The fire tests for plastics were developed in order to determine the resistance of the materials to ignition and flame spread.

The materials have to pass horizontal burning tests (Classification UL 94HB) or the more stringent vertical tests (UL 94V-2, V-1 or V-0), depending on the fire-protection requirements. These tests simulate low-energy ignition sources which occur in electrical devices and to which plastic parts in electrical modules can be exposed.

SUMMARY OF THE INVENTION

Surprisingly, it has now been found that salts of phosphinic acids, in combination with a large number of synergistic compounds, prove to be effective flame retardants for thermoset resins, such as unsaturated polyester resins or epoxy resins.

Alkali metal salts of phosphinic acids have previously been proposed as flame-retardant additives for thermoplastic polyesters (DE-A-44 30 932). They have to be added in amounts of up to 30% by weight. The salts of phosphinic acids with an alkali metal or with a metal of the second or third main group of the Periodic Table, in particular the zinc salts (DE-A-2 447 727) have also been used to prepare flame-retardant polyamide molding compositions. There is a marked difference in fire performance between thermoplastic polyesters, such as PET and PBT, and thermosetting polyesters, such as unsaturated polyester resins: in a fire thermoplastic materials produce drops of falling material, but thermosetting materials do not melt or produce drops of falling material.

DESCRIPTION OF THE PREFERRED EMBODIMENTS

Specifically, the invention relates to flame-retardant thermoset compositions which comprise, as flame retardant, at least one phosphinic salt of the formula (I) and/or a diphosphinic salt of the formula (II) and/or polymers of these

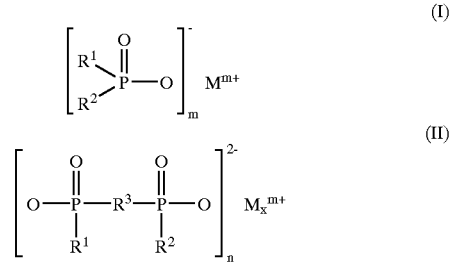

where
R¹,R² are identical or different and are $C_1$–$C_6$-alkyl, linear or branched, and/or aryl;
R³ is $C_1$–$C_{10}$-alkylene, linear or branched, $C_6$–$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na and/or K;
m is from 1 to 4;
n is from 1 to 4; and
x is from 1 to 4,
and also comprise at least one synergistic component selected from the group of substances consisting of metal hydroxide, nitrogen compounds and phosphorus-nitrogen compounds.

R¹ and R² are preferably identical or different and are $C_1$–$C_6$-alkyl, linear or branched, and/or phenyl.

R¹ and R² are preferably identical or different and are methyl, ethyl, n-propyl, isopropyl, n-butyl, tert-butyl, n-pentyl and/or phenyl.

R³ is preferably methylene, ethylene, n-propylene, isopropylene, n-butylene, tert-butylene, n-pentylene, n-octylene or n-dodecylene.

Other preferred radicals for R³ are phenylene and naphthylene.

Other preferred radicals for R³ are methylphenylene, ethylphenylene, tert-butylphenylene, methylnaphthylene, ethylnaphthylene and tert-butylnaphthylene.

Other preferred radicals for R³ are phenylmethylene, phenylethylene, phenylpropylene and phenylbutylene.

The novel flame-retardant thermoset compositions preferably comprise from 5 to 30 parts by weight of at least one phosphinic salt of the formula (I) and/or a diphosphinic salt of the formula (II) and/or polymers of these, and from 10 to 100 parts by weight of metal hydroxide, per 100 parts by weight of thermoset composition.

The metal hydroxide is preferably aluminum hydroxide or magnesium hydroxide.

The novel flame-retardant thermoset compositions preferably comprise from 5 to 30 parts by weight of at least one phosphinic salt of the formula (I) and/or a diphosphinic salt of the formula (II) and/or polymers of these, and from 10 to 100 parts by weight of nitrogen compound, per 100 parts by weight of thermoset composition.

The nitrogen compound is preferably melamine, a melamine derivative of cyanuric acid, a melamine derivative of isocyanuric acid, a melamine salt, such as melamine phosphate or melamine diphosphate, dicyandiamide or a guanidine compound, such as guanidine carbonate, guanidine phosphate or guanidine sulfate, and/or is a condensation product of ethyleneurea and formaldehyde.

The novel flame-retardant thermoset compositions preferably comprise from 5 to 30 parts by weight of at least one phosphinic salt of the formula (I) and/or a diphosphinic salt of the formula (II) and/or polymers of these, and from 5 to 30 parts by weight of phosphorus-nitrogen compound, per 100 parts by weight of thermoset composition.

The phosphorus-nitrogen compound is preferably ammonium polyphosphate.

The ammonium polyphosphate preferably comprises from 0.5 to 20% by weight of a water-insoluble synthetic resin which may have been cured and which encapsulates the individual ammonium polyphosphate particles.

The invention further relates to flame-retardant thermoset compositions which are molding compositions, coatings or laminates made from thermoset resins.

The thermoset resins are preferably unsaturated polyester resins or epoxy resins.

The invention further relates to a process for preparing flame-retardant thermoset compositions, which comprises mixing a thermoset resin with a flame retardant made from at least one phosphinic salt of the formula (I) and/or a diphosphinic salt of the formula (II) and/or polymers of these with at least one synergistic component selected from the group of substances consisting of metal hydroxides, nitrogen compounds and phosphorus-nitrogen compounds, and wet-pressing (cold-pressing) the resultant mixture at pressures of from 3 to 10 bar and at temperatures of from 20 to 80° C.

The invention further relates to a process for preparing flame-retardant thermoset compositions, which comprises mixing a thermoset resin with a flame retardant made from at least one phosphinic salt of the formula (I) and/or a diphosphinic salt of the formula (II) and/or polymers of these with at least one synergistic component selected from the group of substances consisting of metal hydroxide, nitrogen compounds and phosphorus-nitrogen compounds, and wet-pressing (warm- or hot-pressing) the resultant mixture at pressures of from 3 to 10 bar and at temperatures of from 80 to 150° C.

Another process for preparing flame-retardant thermoset compositions according to the present invention comprises mixing a thermoset resin with a flame retardant made from at least one phosphinic salt of the formula (I) and/or a diphosphinic salt of the formula (II) and/or polymers of these with at least one synergistic component selected from the group of substances consisting of metal hydroxides, nitrogen compounds and phosphorus-nitrogen compounds, and processing the resultant mixture at pressures of from 50 to 150 bar and at temperatures of from 140 to 160° C. to give prepregs.

Finally, the invention also relates to the use of the novel flame-retardant combination for rendering thermoset compositions flame-retardant. The thermoset compositions are preferably unsaturated polyester resins or epoxy resins, and are preferably molding compositions, coatings or laminates.

The salts of the phosphinic acids, as used according to the invention, may be prepared by known methods as described in more detail, for example, in EP-A-0 699 708.

As set out in the examples below, it has been shown that when tested by themselves, even at relatively high concentrations in thermoset resins, aluminum hydroxide, nitrogen flame retardants, phosphorus-nitrogen compounds, such as ammonium polyphosphate, and salts of phosphinic acids of the general formula (I) or (II) have little effect.

Surprisingly, it has now been found that a combination of phosphinic salts and aluminum hydroxide or, respectively, phosphinic salts and ammonium polyphosphate or nitrogen flame retardants is suitable for achieving the best material classification, V-0, in the UL 94 vertical test in thermosets. The compounds used in the examples are as follows:

®Alpolit SUP 403 BMT (Vianova Resins GmbH, Wiesbaden, Germany): unsaturated polyester resin, about 57% strength in styrene, acid number not more than 30 mg KOH/g, preaccelerated and formulated to be slightly thixotropic, low viscosity (viscosity from a 4 mm flow cup: 110±10 s) and greatly reduced styrene emission.

®Palatal 340 S (DSM-BASF Structural Resins, Ludwigshafen, Germany): unsaturated polyester resin, about 49% strength in styrene and methyl methacrylate, density 1.08 g/ml, acid number 7 mg KOH/g, preaccelerated, low viscosity (dynamic viscosity about 50 mPa*s).

®Beckopox EP 140 (Vianova Resins GmbH, Wiesbaden, Germany): low-molecular-weight condensation product from bisphenol A and epichlorohydrin with a density of 1.16 g/ml and an epoxy equivalent of from 180 to 192

®Beckopox EH 625 (Vianova Resins GmbH, Wiesbaden, Germany): modified aliphatic polyamine with an active hydrogen equivalent weight of 73 and a dynamic viscosity of about 1000 mpa*s.

®Modar 835 S (Ashland Composite Polymers Ltd., Kidderminster, England): modified acrylate resin dissolved in styrene, viscosity about 55 mpa*s at 25° C.

®Martinal ON 921 (Martinswerk GmbH, Bergheim, Germany): low-viscosity increase flame-retardant aluminum hydroxide filler for plastic resins, with particle size of>60%<45 μm.

®Exolit AP 422 (Clariant GmbH, Frankfurt am Main, Germany): finely divided, low-water-solubility ammonium polyphosphate of formula $(NH_4PO_3)_n$, where n=approx. 700, with particle size of>99%<45 μm.

Cobalt accelerator NL 49P (Akzo Chemie GmbH, Düren, Germany): cobalt octoate solution in dibutyl phthalate with a cobalt content of 1% by weight.

Cobalt accelerator NL 63–10S (Akzo Chemie GmbH, Düren, Germany).

Butanox M 50 (Akzo Chemie GmbH, Düren, Germany): methyl ethyl ketone peroxide phlegmatized with dimethyl phthalate—clear liquid with a content of at least 9% by weight of active oxygen.

Lucidol BT 50 dibenzoyl peroxide (Akzo Chemie GmbH, Düren, Germany)

DEPAL: aluminum salt of diethylphosphinic acid.

Preparation of Test Specimens

The thermoset resin and the flame retardant components, and also, if desired, other additives are mixed homogeneously using a dissolver disk. Homogenization is repeated after adding the curing agent.

In the case of unsaturated polyester resins, the resin is mixed with the cobalt accelerator, the flame retardant components are added and the curing is initiated by adding the peroxide after homogenization.

In the case of epoxy resins, the flame retardant components are added to the epoxy resin component and mixed homogeneously. The amine hardener or, respectively, the anhydride hardener is then added.

Two layers of continuous-strand glass-fiber mat of 450 g/m$^2$ weight per unit area, on a ®Hostaphan release film and a steel frame, are placed in a heated press. About half of the resin-flame-retardant mixture is then uniformly distributed. Another glass mat is then added and then the remaining resin-flame-retardant mixture is distributed, the laminate is covered with a release film and a pressed sheet of 4 mm thickness is produced at a temperature of 50° C. during a period of one hour at a pressure of 10 bar.

The fire performance testing was carried out according to the Underwriters Laboratories "Test for Flammability of Plastics Materials—UL 94" specification, in the May 2, 1975 edition, using specimens of length 127 mm, width 12.7 mm and various thicknesses.

The determination of oxygen index was based on ASTM D 2863–74, using a modified apparatus.

1. Results With Unsaturated Polyester Resins

Table 1 shows comparative examples with use, on their own, of aluminum hydroxide, melamine, ammonium polyphosphate and DEPAL as flame retardants for an unsaturated polyester resin (Viapal UP 403 BMT). It can be seen from the table that the use, on its own, of aluminum hydroxide at concentrations up to 175 parts per 100 parts of unsaturated polyester resin cannot achieve V-0 classification.

Nor can the use, on their own, of melamine or ammonium polyphosphate at concentrations of up to 75 parts per 100 parts of unsaturated polyester resin achieve V-0 classification.

TABLE 1

(Comparative Examples)
Fire performance of unsaturated polyester resin laminates to UL 94, 30% by weight of continuous-strand glass-fiber mat, laminate thickness 1.5 mm, Viapal UP 403 BMT resin, Butanox M50 hardener, NL 49 P accelerator

| Example No. | Parts of flame retardant/100 parts resin | Afterflame time [s] after $1^{st}$ flame application | Afterflame time [s] after $2^{nd}$ flame application | UL 94 classification | LOI |
|---|---|---|---|---|---|
| 1 | 125 ATH* | consumed | — | n.c. | 0.30 |
| 2 | 150 ATH | consumed | — | n.c. | 0.33 |
| 3 | 175 ATH | 5 s | 32 s | n.c. | 0.37 |
| 4 | 25 Exolit AP 422 | consumed | — | n.c. | 0.23 |
| 5 | 50 Exolit AP 422 | consumed | — | n.c. | 0.25 |
| 6 | 75 Exolit AP 422 | 2 s | consumed | n.c. | 0.26 |
| 7 | 25 melamine | consumed | — | n.c. | 0.23 |
| 8 | 50 melamine | consumed | — | n.c. | 0.25 |
| 9 | 75 melamine | 6 s | consumed | n.c. | 0.33 |
| 10 | 25 DEPAL** | 5 s | 60–70 | n.c. | 0.33 |

*ATH = alumina trihydrate (Martinal ON 921)
**DEPAL = aluminum salt of diethylphosphinic acid
n.c. = not classifiable under the UL 94 vertical test Table 2 shows the novel combination of DEPAL with alumina trihydrate or with ammonium polyphosphate in the unsaturated polyester resin Viapal UP 403 BMT. Here, a V-0 classification can be achieved with a laminate thickness of 1.5 mm by combining DEPAL with alumina trihydrate and adding a total of 120 parts of solid flame retardant to 100 parts of unsaturated polyester resin. The laminates may be pigmented as desired. When ammonium polyphosphate was combined with DEPAL, even 40 parts of flame retardant could achieve V-0 classification. Using melamine as synergist to DEPAL, 60 parts of flame retardant are needed for V-0 classification.

The low filler content of these UP resin laminates meant that they could be used in injection processes.

Instead of melamine cyanurate it is also possible to use other organic nitrogen compounds, such as melamine, melamine phosphate, guanidine phosphate or dicyandiamide.

TABLE 2

(invention)
Fire performance of unsaturated polyester resin laminates to UL 94, 30% by weight of continuous-strand glass-fiber mat, laminate thickness 1.5 mm, Viapal UP 403 BMT resin, Butanox M50 hardener, NL 49 P accelerator

| Example No. | Parts flame retardant/100 parts resin | Afterflame time [s] after $1^{st}$ flame application | Afterflame time [s] after $2^{nd}$ flame application | UL 94 classification | LOI |
|---|---|---|---|---|---|
| 11 | 20 ATH / 20 DEPAL | 40–50 | — | n.c. | 0.27 |
| 12 | 50 ATH / 20 DEPAL | 15 | 25 | V-1 | 0.34 |
| 13 | 100 ATH / 20 DEPAL | <1 | 3–5 | V-0 | 0.36 |
| 14 | 20 Exolit AP 422 / 20 DEPAL | 1 | 2–4 | V-0 | 0.35 |
| 15 | 20 melamine / 20 DEPAL | consumed | — | n.c. | 0.31 |
| 16 | 30 melamine / 30 DEPAL | <1 | <1 | V-0 | 0.35 |
| 17 | 50 melamine / 10 DEPAL | <1 | <1 | V-0 | 0.32 |

Table 3 shows the combination of DEPAL with alumina trihydrate in the unsaturated polyester resin Palatal 340S. Here, addition of a total of 90 parts of solid flame retardant to 100 parts of unsaturated polyester resin can achieve V-0 classification at a laminate thickness of 1.5 mm. The laminates may be pigmented as desired.

In contrast, the same flammability classification is achieved only above 180 parts of flame retardant when using alumina trihydrate on its own.

TABLE 3

Fire performance of unsaturated polyester resin laminates to UL 94, 30% by weight of continuous-strand glass-fiber mat, laminate thickness 1.5 mm, Palatal 340 S resin, Butanox M 50 hardener, NL 49 P accelerator

| Example No. | Parts flame retardant/ 100 parts resin | Afterflame time [s] after $1^{st}$ flame application | Afterflame time [s] after $2^{nd}$ flame application | UL 94 classification | LOI |
|---|---|---|---|---|---|
| 18 (comp.) | 100 ATH | consumed | — | n.c. | 0.25 |
| 19 (comp.) | 180 ATH | <1 s | <1 s | V-0 | 0.52 |
| 20 (comp.) | 25 DEPAL | consumed | — | n.c. | 0.30 |
| 21 (inv.) | 20 DEPAL / 50 ATH | 2 s | consumed | n.c. | 0.34 |
| 22 (inv.) | 30 DEPAL / 6 ATH | <1 s | 8 s | V-0 | 0.41 |

Table 4 shows the combination of DEPAL with alumina trihydrate in the modified acrylate resin Modar 835S. There, adding a total of 70 parts of solid flame retardant to 100 parts of resin can achieve V-0 classification at a laminate thickness of 1.5 mm.

In contrast, the same flammability classification is achieved only above 180 parts of flame retardant when using alumina trihydrate on its own.

TABLE 4

Fire performance of acrylate laminates to UL 94, 30% by weight of continuous-strand glass-fiber mat, laminate thickness 1.5 mm, Modar 835 s resin, Lucidol BT 50 hardener, NL 63-10 P accelerator

| Example No. | Parts flame retardant/ 100 parts resin | Afterflame time [s] after 1st flame application | Afterflame time [s] after 2nd flame application | UL 94 classi- fication | LOI |
|---|---|---|---|---|---|
| 23 (comp.) | 100 ATH | consumed | — | n.c. | 0.25 |
| 24 (comp.) | 180 ATH | <1 s | <1 s | V-0 | 0.45 |
| 25 (comp.) | 25 DEPAL | consumed | — | n.c. | 0.37 |
| 26 (inv.) | 20 DEPAL 50 ATH | 1 s | 6 s | V-0 | 0.42 |

2. Results With Epoxy Resins

Table 5 shows fire tests using a polyamine-cured epoxy resin (Beckopox EP 140 resin, Beckopox EH 625 hardener). By combining DEPAL with alumina trihydrate and adding a total of 60 parts of solid flame retardant to 100 parts of epoxy resin, V-0 classification is achieved at a laminate thickness of 1.5 mm. In contrast, UL 94 V-0 is not achieved using alumina trihydrate on its own at up to 150 parts.

TABLE 5

Fire performance of epoxy resin moldings to UL 94, material thickness 1.6 mm, resin 100 parts of Beckopox EP 140, hardener 39 parts of Beckopox EH 625

| Example No. | Parts flame retardant/ 100 parts resin | Afterflame time [s] after 1st flame application | Afterflame [s] after 2nd flame application | time UL 94 classi- fication | [s] LOI |
|---|---|---|---|---|---|
| 25 (comp.) | 50 ATH | consumed | — | n.c. | 0.23 |
| 26 (comp.) | 100 ATH | consumed | — | n.c. | 0.26 |
| 27 (comp.) | 150 ATH | consumed | — | n.c. | 0.30 |
| 28 (comp.) | 10 Exolit AP 422 | consumed | n.c. | 0.25 | |
| 29 (comp.) | 15 Exolit AP 422 | consumed | n.c. | C.26 | |
| 30 (comp.) | 20 Exolit AP 422 | 1 s | 15 s | V-1 | 0.27 |
| 31 (comp.( | 10 DEPAL | 1 s | consumed | n.c. | 0.27 |
| 32 (comp.) | 20 DEPAL | 1 s | 16 s | V-1 | 0.32 |
| 33 (inv.) | 10 DEPAL 50 ATH | <1 s | 3 s | V-0 | 0.33 |

Table 6 shows fire tests using an epoxy resin cured by a carboxylic anhydride (Beckopox EP 140 resin, methyltetrahydrophthalic anhydride hardener). By combining DEPAL with alumina trihydrate and adding a total of 60 parts of solid flame retardant to 100 parts of epoxy resin, V-0 classification can be achieved at a laminate thickness of 1.5 mm. In contrast, UL 94 V-0 is not achieved using alumina trihydrate on its own at up to 150 parts of flame retardant.

TABLE 6

Fire performance of epoxy resin moldings to UL 94, material thickness 2.0 mm, resin 100 parts of Beckopox EP 140, hardener 89 parts of methyltetrahydrophthalic anhydride

| Example No. | Parts flame retardant/ 100 parts resin | Afterflame time [s] after 1st flame application | Afterflame [s] after 2nd flame application | time UL 94 classi- fication | [s] LOI |
|---|---|---|---|---|---|
| 34 (comp.) | 50 ATH | consumed | — | n.c. | 0.23 |
| 35 (comp.) | 100 ATH | consumed | — | n.c. | 0.25 |
| 36 (comp.) | 150 ATH | consumed | — | n.c. | 0.28 |
| 37 (comp.) | 10 Exolit AP 422 | consumed | — | n.c. | 0.25 |
| 38 (comp.) | 15 Exolit AP 422 | consumed | — | n.c. | 0.26 |
| 39 (comp.) | 20 Exolit AP 422 | consumed | — | n.c. | 0.27 |
| 40 (comp.) | 10 DEPAL | 1 s | consumed | n.c. | 0.27 |
| 41 (comp.) | 25 DEPAL | 1 s | 16 s | V-1 | 0.32 |
| 42 (inv.) | 10 DEPAL 50 ATH | <1 s | 3 s | V-0 | 0.33 |

What is claimed is:

1. A flame-retardant thermoset composition which comprises a thermoset resin and, as flame retardant, at least one phosphinic salt of the formula (I) and/or a diphosphinic salt of the formula (II) and/or polymers of these

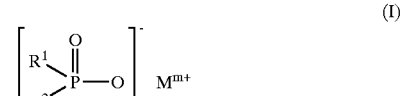

(I)

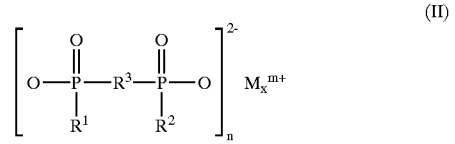

(II)

where

R¹, R² are identical or different and are $C_1$–$C_6$-alkyl, linear or branched, and/or aryl;

R³ is $C_1$–$C_{10}$-alkylene, linear or branched, $C_6$–$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na and/or K;

m is from 1 to 4;

n is from 1 to 4; and x is from 1 to 4, and also comprises at least one synergistic component selected from the group of substances consisting of metal hydroxide, nitrogen compounds and phosphorous-nitrogen compounds.

2. A flame-retardant thermoset composition as claimed in claim 1, wherein R¹ and R² are identical or different and are $C_1$–$C_6$-alkyl, linear or branched, and/or phenyl.

3. A flame-retardant thermoset composition as claimed in claim 1, wherein R¹ and R² are identical or different and are methyl, ethyl, n-propyl, isopropyl, n-butyl, tert-butyl, n-pentyl and/or phenyl.

4. A flame-retardant thermoset composition as claimed in claim 1, wherein R³ is methylene, ethylene, n-propylene, isopropylene, n-butylene, tert-butylene, n-pentylene, n-octylene or n-dodecylene.

5. A flame-retardant thermoset composition as claimed in claim 1, wherein R³ is phenylene or naphthylene.

6. A flame-retardant thermoset composition as claimed in claim 1, wherein $R^3$ is methylphenylene, ethylphenylene, tert-butyl-phenylene, methylnaphthylene, ethylnaphthylene or tert-butylnaphthylene.

7. A flame-retardant thermoset composition as claimed in claim 1, wherein $R^3$ is phenylmethylene, phenylethylene, phenylpropylene or phenylbutylene.

8. A flame-retardant thermoset composition as claimed in claim 1, which comprises from 5 to 30 parts by weight of phosphinic salt of the formula (I) and/or a diphosphinic salt of the formula (II) and/or polymers of these, and from 10 to 100 parts by weight of metal hydroxide, per 100 parts by weight of thermoset composition.

9. A flame-retardant thermoset composition as claimed in claim 1, wherein the metal hydroxide is aluminum hydroxide or magnesium hydroxide.

10. A flame-retardant thermoset composition as claimed in claim 1, which comprises from 5 to 30 parts by weight of phosphinic salt of the formula (I) and/or a diphosphinic salt of the formula (II) and/or polymers of these, and from 10 to 100 parts by weight of nitrogen compound, per 100 parts by weight of thermoset composition.

11. A flame-retardant thermoset composition as claimed in claim 1, wherein the nitrogen compound is melamine, a melamine derivative of cyanuric acid, a melamine derivative of isocyanuric acid, a melamine salt, such as melamine phosphate or melamine diphosphate, dicyandiamide or a guanidine compound, such as guanidine carbonate, guanidine phosphate or guanidine sulfate, and/or is a condensation product of ethyleneurea and formaldehyde.

12. A flame-retardant thermoset composition as claimed in claim 1, which comprises from 5 to 30 parts by weight of phosphinic salt of the formula (I) and/or a diphosphinic salt of the formula (II) and/or polymers of these, and from 5 to 30 parts by weight of phosphorus-nitrogen compound, per 100 parts by weight of thermoset composition.

13. A flame-retardant thermoset composition as claimed in claim 1, wherein the phosphorus-nitrogen compound is ammonium polyphosphate.

14. A flame-retardant thermoset composition as claimed in claim 1, wherein the ammonium polyphosphate comprises from 0.5 to 20% by weight of a water-insoluble synthetic resin which may have been cured and which encapsulates the individual ammonium polyphosphate particles.

15. A flame-retardant thermoset composition as claimed in claim 1, which is a molding composition, a coating or a laminate made from thermoset resins.

16. A flame-retardant thermoset composition as claimed in claim 15, wherein the thermoset resins are unsaturated polyester resins or epoxy resins.

17. A process for preparing a flame-retardant thermoset composition wherein the flame-retardant thermoset composition comprises a thermoset resin and, as flame retardant, at least one phosphinic salt of the formula (I) and/or a diphosphinic salt of the formula (II) and/or polymers of these

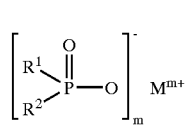

(I)

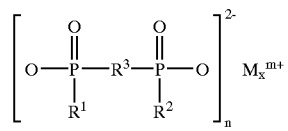

(II)

where $R^1$, $R^2$ are identical or different and are $C_1$–$C_6$-alkyl, linear or branched, and/or aryl;

$R^3$ is $C_1$–$C_{10}$-alkylene, linear or branched, $C_6$–$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na and/or K;

m is from 1 to 4;

n is from 1 to 4; and x is from 1 to 4, and also comprises at least one synergistic component selected from the group of substances consisting of metal hydroxide, nitrogen compounds and phosphorous-nitrogen compounds, the process comprising mixing a thermoset resin with a flame retardant made from phosphinic salt of the formula (I) and/or a diphosphinic salt of the formula (II) and/or polymers of these with at least one synergistic component selected from the group of substances consisting of metal hydroxides, nitrogen compounds, and phosphorous-nitrogen compounds, and wet-pressing (cold-pressing) the resultant mixtures at pressures of from 3 to 10 bar and at temperatures of from 20 to 60° C.

18. The process for preparing the flame-retardant thermoset composition as claimed in claim 17, which comprises mixing a thermoset resin with a flame retardant made from phosphinic salt of the formula (I) and/or a diphosphinic salt of the formula (II) and/or polymers of these with at least one synergistic component selected from the group of substances consisting of metal hydroxides, nitrogen compounds, and phosphorous-nitrogen compounds, and wet-pressing (warm- or hot-pressing) the resultant mixture at pressures of from 3 to 10 bar and at temperatures of from 80 to 150° C.

19. The process for preparing the flame-retardant thermoset composition as claimed in claim 17, which comprises mixing a thermoset resin with a flame retardant made from phosphinic salt of the formula (I) and/or a diphosphinic salt of the formula (II) and/or polymers of these with at least one synergistic component selected from the group of substances consisting of metal hydroxides, nitrogen compounds, and phosphorous-nitrogen compounds, and processing the resultant mixture at pressures of from 50 to 150 bar and at temperatures of from 140 to 160° C. to give prepregs.

20. A method of making a flame-retardant thermoset composition wherein the flame-retardant thermoset composition comprises a thermoset resin and, as flame retardant, at least one phosphinic salt of the formula (I) and/or a diphosphinic salt of the formula (II) and/or polymers of these

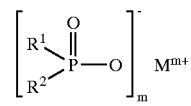

(I)

-continued

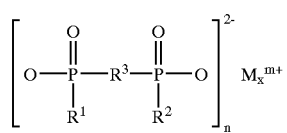
(II)

where

R¹, R² are identical or different and are $C_1$–$C_6$-alkyl, linear or branched, and/or aryl;

R³ is $C_1$–$C_{10}$-alkylene, linear or branched, $C_6$–$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na and/or K;

m is from 1 to 4;

n is from 1 to 4; and x is from 1 to 4, and also comprises at least one synergistic component selected from the group of substances consisting of metal hydroxide, nitrogen compounds and phosphorous-nitrogen compounds; the method comprising incorporating the flame-retardant combination in the thermoset resin.

21. The method of making as claimed in claim 20, wherein the thermoset resin is an unsaturated polyester resin or an epoxy resin.

22. The method of making as claimed in claim 20, wherein the thermoset resin composition is a molding composition, a coating or a laminate.

* * * * *